Nov. 8, 1949
W. BROWN
2,487,520
HYDRAULIC POWER TRANSMISSION WITH
BYPASS FLOW CONTROL VALVE
Filed Dec. 26, 1944
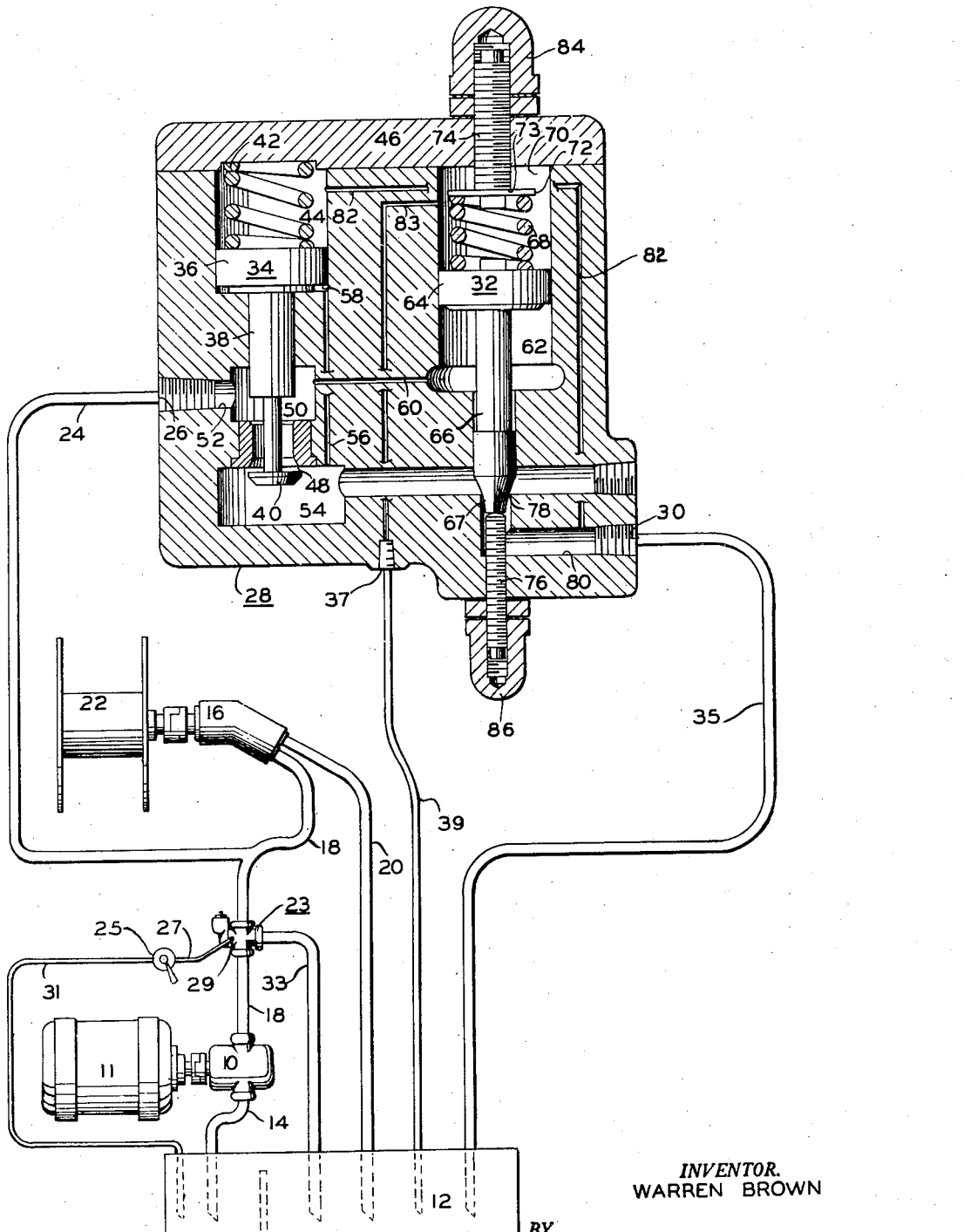
INVENTOR.
WARREN BROWN
BY
*Ralph L. Tweedale*
ATTORNEY Patented Nov. 8, 1949

2,487,520

UNITED STATES PATENT OFFICE 2,487,520

HYDRAULIC POWER TRANSMISSION WITH BYPASS FLOW CONTROL VALVE

Warren Brown, Drexel Hill, Pa., assignor to Vickers Incorporated, Detroit, Mich., a corporation of Michigan Application December 26, 1944, Serial No. 569,826

13 Claims. (Cl. 60—53)

This invention relates to power transmissions, particularly to those of the type comprising two or more fluid pressure energy translating devices, one of which may function as a pump and another as a fluid motor.

The invention is particularly adapted for use with a reeling device and has been illustrated as applied to a mechanism of this character although it will be understood that the invention is equally adaptable to other applications.

In order to maintain a uniformly constant tension upon a strip of material being wound upon a reel, it is necessary, as the diameter of the reeled material increases, to keep the peripheral speed of the reel at a substantially constant value. As the diameter of the material on the reel increases, the torque on the reel must be increased, and the speed of the reel must be decreased proportionally to the increase in diameter of the material being wound upon the reel. As the diameter of the wound material increases, the torque of the driving motor must gradually increase, and the speed of the motor must gradually decrease. The reason for this is that the strip of material is being delivered at a uniform linear speed while the reel increases in diameter, and its rotary speed decreases relative to the peripheral speed.

In the past, hydraulic power transmissions comprising a fixed displacement pump and a variable displacement motor, the displacement of which was controlled by an automatic pressure responsive regulator, have been used fairly satisfactorily to maintain constant tension on the material being reeled. In other cases, a transmission utilizing a fixed displacement pump and motor together with a throttle valve bleed-off to control the speed of the motor has been used with partial success. However, the first method of maintaining constant tension, although much more expensive because of the difference in cost between a constant and a variable displacement motor, was preferred because of being more accurate than an ordinary throttle valve bleed-off. The throttle valve requires manual operation and control, and a slight error in judgment increases or decreases the flow of fluid being controlled by the throttle valve with serious consequences.

It is an object of this invention to provide a pressure responsive, flow regulating device for a hydraulic transmission for driving a reel or other load device containing a fixed displacement type pump and motor which will automatically change the speed of the motor driving the reel or load device in response to changes in torque.

It is also an object of the present invention to provide a power transmission and control therefor which will operate to maintain a constant tension on a strip of material being wound on a reel and maintain a constant peripheral speed on the reeled material automatically in accordance with the load on the transmission.

It is also an object of the present invention to provide a flow regulating device for a hydraulic power transmission for driving a reel containing a fixed displacement type pump and motor which will automatically vary the output speed of the transmission, causing an increase in torque and a decrease in speed of the driving motor as the diameter of the material being wound on the reel increases.

It is a further object of this invention to provide a pressure responsive valve which, when used in conjunction with a fixed displacement pump and motor, will automatically decrease the speed of the motor driving a reel as a strip of material being wound upon the reel increases in diameter, thereby maintaining a uniform constant tension upon the material.

It is a further object of this invention to provide a simply and economically constructed pressure responsive valve to be used in conjunction with a fixed displacement pump and motor driving a reel or other load device which is more economical than the use of a variable motor and more accurate than an ordinary throttle valve bleed-off.

Further objects and advantages of the present invention will be apparent from the following description, reference being had to the accompanying drawing wherein a preferred form of the present invention is clearly shown.

In the drawing the single figure shown is a diagrammatic view of a power transmission system incorporating a preferred form of the present invention.

Referring now to the single figure, there is illustrated a pump 10 of the fixed displacement type, which may be driven by an electric motor 11, which is supplied with fluid from a tank 12 by means of a suction conduit 14. The pump 10 delivers fluid under pressure to a hydraulic motor 16 of the fixed displacement type by means of a delivery conduit 18, the return fluid from the motor 16 being delivered to the tank 12 by means of a conduit 20. The motor 16 drives a reel 22 used for the purpose of winding a strip of material thereon.

A suitable relief valve 23 may be provided in the conduit 18 and is preferably constructed in accordance with the disclosure of the patent to Harry F. Vickers, No. 2,043,453. Valves of this character may be provided with a venting port for venting the control chamber in order to permit the main valve to act as an unloading valve and by pass the pump delivery at negligible pressure. A suitable manually controlled, two-way control valve 25 is connected by means of a conduit 27 to the venting port 29 and to tank 12 by means of a conduit 31. In one position, valve 25 will close venting port 29 and direct fluid from pump 10 to motor 16 to start said motor, while in another position valve 25 will open venting port 29 to tank 12 by means of conduits 27 and 31, permitting valve 23 to open completely and unload pump 10 to tank 12 by means of conduit 33, thus stopping motor 16. Relief valve 23 also serves as a safety factor in limiting the maximum pressure able to be developed in the system.

A branch conduit 24 of the pump delivery conduit 18 connects to an inlet port 26 of a flow regulating valve 28 which also has an outlet port 30 which connects to tank 12 by a conduit 35 and a drain port 37 connected to tank 12 by means of a conduit 39.

The flow regulating valve 28 is comprised of a housing containing a pressure responsive throttle valve 32 and a hydrostatic compensating valve 34 in series therewith and responsive to pressure changes ahead of and beyond the first throttle valve 32.

The hydrostatic compensating valve 34 is comprised of a piston 36 connected to a stem 38, at the other end of which is a poppet valve 40. A coil spring 42 located within a spring chamber 44 and abutting the upper side of piston 36 and the inner side of an end cap 46 of valve 28, the space between which forms chamber 44, normally unseats valve 40 from a valve seat 48. An inlet chamber 50 of compensating valve 34 is in open communication with inlet port 26 of valve 28 by means of a passageway 52 and is also in communication with a chamber 54 located within the housing of valve 28 when poppet valve 40 is unseated. A conduit 56 connects chamber 54 to a chamber 58 on the underside of piston 36 so as to make piston 36 responsive to pressure increases or decreases within chamber 54 and thus respectively seat or unseat inlet valve 40.

A conduit 60 connects inlet chamber 50 of compensating valve 34 with a pressure chamber 62 of throttle valve 32 which is comprised of a piston 64 connected to a stem 66 which is tapered at its end to form a metering bypass valve 67. A coil spring 68 of predetermined resistance characteristics is located within a chamber 70 formed in the space between the upper side of piston 64 and the inner side of end cap 46 of valve 28. A spring retainer member 72 fitting against a shoulder 73 formed at one end of an adjustable screw 74 and abutting the upper end of spring 68 positions the lower end of spring 68 against the upper side of piston 64. The spring 68 acts to position valve 67 so as to normally rest on an adjustable set screw 76 and form an orifice 78 between chamber 54 and a passageway 80 which is in communication with outlet port 30.

Valve 67 is designed to make possible a gradually increasing flow of fluid through orifice 78 by gradually increasing the size of orifice 78 in predetermined relation to an increase of pressure in chamber 62 of valve 32.

Chamber 44 of valve 34 is vented by means of a conduit 82 which forms a communication between chamber 44 and passageway 80. This also serves to transmit any back pressure existing at port 30 over to chamber 44 where it can have a compensating effect on piston 36, thus making valve 34 truly responsive to the pressure difference existing across throttle 67. Chamber 70 of valve 32 is vented by means of a passageway 83 which connects chamber 70 to drain port 37 and conduit 39 connecting drain port 37 to tank 12 and drains any fluid seepage past piston 64 to tank 12.

Protective caps 84 and 86 are threaded over adjustable screw 74 and calibrated set screw 76.

To start operation, the control handle of valve 25 is shifted by the operator to close venting port 29 of valve 25 and to direct full pump flow to motor 16. With the pump 10 running and the material just starting to be wound upon reel 22, the tension upon the winding material is at normal operating value. Fluid pressure in conduit 18 is low because the radius at which the strip tension is acting is small, creating a low torque, and the fluid motor is operating the reel at the highest possible speed. At the same time as fluid under pressure is being delivered by pump 10 to motor 16, a certain amount of fluid is also being bypassed from pump 10 through valve 28 to tank 12. The fluid being bypassed enters conduit 24, inlet port 26 of valve 28, passageway 52, inlet chamber 50, past inlet valve 40 to chamber 54, through orifice 78, passageway 80, outlet port 30 and conduit 35 to tank 12. At the same time, fluid in chamber 54 enters conduit 56 to chamber 58 and acts against piston 36. Also at the same time, fluid under pressure entering inlet chamber 50 of valve 34 also enters chamber 62 of valve 32 by means of passageway 60. Pressure in chamber 62 is equivalent to pressure in conduit 18 while pressure in chamber 58 of valve 34 is equivalent to pressure in chamber 54 of valve 28.

Valve 34 acts to maintain a uniform predetermined pressure drop across orifice 78, thus maintaining constant the rate of flow through the valve for any given setting of the throttle 32. Any increase in pressure in chamber 54, and consequently in chamber 58, tends to close poppet valve 40, thus maintaining constantly uniform the pressure in chamber 54 and likewise the rate of flow through orifice 78 at a given setting.

As the diameter of the wound material on the reel increases, the pressure in conduit 18 will increase because of the increased torque of motor 16, which pressure will immediately react on the underside of piston 64 of valve 32. The increased pressure in conduit 18 will raise piston 64 and stem 67 a predetermined amount, increasing the size of the orifice opening 78. Orifice 78 increases in size in predetermined relationship to the increase of pressure in conduit 18, thus increasing the flow of fluid being bypassed from pump 10 and proportionately decreasing the supply of fluid to motor 16 and consequently reducing its speed. By increasing the torque of motor 16 and decreasing its speed, as the wound material increases in diameter its rotary speed will decrease relative to its peripheral speed and a constant uniform tension will be maintained on the wound material. This is accomplished by the pressure in line 18 which progressively increases as the reel driving torque increases and by its reaction on piston 64 progressively overcomes the force of spring 68 and consequently lifts the throttle valve 67. The curvature of throttle 67 is so chosen that for every position thereof (which corresponds to a given reel torque) the throttle opening will pass that quantity of oil represented by the difference between pump displacement and motor displacement (at the speed corresponding to such given reel torque). Since constant tension and linear speed are desired in the strip being wound, it follows that, neglecting losses, the hydraulic horsepower required will be constant. In other words, the product of motor displacement and motor pressure should be a constant. Accordingly, by properly shaping the throttle 67, there is provided an orifice which will vary in size automatically in accordance with pressure changes in line 18, and, since the compensating valve 34 maintains a constant pressure drop across this orifice, the flow through throttle 67 will be in exact proportion to its size.

It will be understood that departures from the condition of true constant hydraulic horsepower can be achieved if desired by proper proportioning of the throttle 67. Thus, compensation for losses at high motor speeds can be built into the valve so as to maintain true constant output horsepower at the real hub. Likewise, in cases where it is desired to vary the tension in the strip as the diameter increases, this may be done with equal facility by providing the proper shape at throttle 67.

When the strip of material is completely wound upon reel 22, the control handle of valve 25 is shifted by the operator, opening venting port 29 to tank 12 by means of conduits 27 and 31 permitting valve 23 to open completely and unload pump 10 to tank 12 by means of conduit 33, completely bypassing motor 16 and thus stopping said motor.

It should be noted that the size of orifice 78 is originally set to pass a predetermined flow of fluid by means of set screw 76. This will be adjusted to provide the correct motor speed required at the beginning of a winding operation and its setting will depend upon the diameter of the reel core.

As a constant uniform tension may be maintained upon the strip of material increasing in diameter as it is being wound upon the reel 22 by decreasing the speed of the motor relative to the increase in torque of such motor, the flow regulating device is a simple and economical means of performing this function. It should be noted that the speed of the motor 16 driving the reel 22 is dependent upon the fluid volume output of pump 10 reaching motor 16. The flow regulating device will bypass a predetermined uniformly increasing flow of fluid from pump 10, decreasing the speed of motor 16 in relative proportion to a predetermined increase of pressure developed by an increase in torque of motor 16. Thus, a uniform constant tension is maintained on the winding strip of material, increasing in diameter as it is being wound upon the reel.

While the form of embodiment of the invention as herein disclosed constitutes a preferred form, it is to be understood that other forms might be adopted, all coming within the scope of the claims which follow. Although the invention has been shown to be suitable and adaptable for use in a hydraulic transmission for driving a reel comprising a fixed displacement pump and motor driving the reel, it may be successfully applied in a similar hydraulic transmission for driving any load device where similar results are desired. Thus, the invention may be applied in a hydraulic transmission containing a fixed displacement pump and motor driving a load device where it is desired to drive the load device at varying and progressive speeds and torques but at substantially constant horsepower, or where a desired relationship between the speed of the driven load device and torque of the same is required in spite of a continuously varying load resistance, or where the speed of the driven load device must change in a predetermined relationship in response to changes in torque.

What is claimed is as follows:

1. A flow-regulating device for use in a hydraulic power system for driving a load device at varying speeds in response to change in torque and comprising in combination a passage through which fluid is adapted to flow at a regulated rate, a throttle in said passage, means for adjusting said throttle automatically in response to pressure changes at the entrance to said passage to regulate the throttle opening as a function of such pressure, and means in series with the throttle in the passage for maintaining a predetermined constant pressure drop across said throttle.

2. In a hydraulic power transmission for driving a reel and having a pump and a fluid motor of fixed volumetric displacement, the combination of a flow-regulating device comprising an adjustable calibrated throttle valve shaped and designed to permit bypassing of an increasing amount of fluid to decrease the speed of the motor relative to a predetermined increase of pressure at the motor, means including a second throttling valve in series therewith and responsive to pressure changes ahead of and beyond the first throttle for maintaining a substantially constant pressure drop across the first throttle, and automatic means responsive to the pressure required to drive the motor for adjusting the first throttle.

3. A flow-regulating device for use in a hydraulic power system for driving a load device at varying speeds in response to changes in torque and comprising in combination a passage through which fluid is adapted to flow at a regulated rate, a throttle in said passage, means for adjusting said throttle automatically in response to pressure changes at the entrance to said passage to regulate the throttle opening as a function of such pressure, and means comprising a second pressure responsive throttle valve in series in the passage with the first throttle valve for maintaining a predetermined constant pressure drop across said throttle.

4. In a hydraulic power transmission for driving a load device at varying speeds and torques but at substantially constant horsepower and having a pump and a fluid motor of fixed volumetric displacement, the combination of a flow-regulating device comprising an adjustable throttle valve, means including a second throttling valve in series therewith and responsive to pressure changes ahead of and beyond the first throttle for maintaining a substantially constant pressure drop across the first throttle, and automatic means responsive to the pressure required to drive the motor for adjusting the first throttle.

5. In a hydraulic power transmission for driving a load device at speeds which are varied in response to changes in torque and having a pump and a fluid motor of fixed volumetric displacement, the combination of a flow-regulating device comprising an adjustable throttle valve, means including a second throttling valve in series therewith and responsive to pressure changes ahead of and beyond the first throttle for maintaining a substantially constant pressure drop across the first throttle, and automatic means responsive to the pressure required to drive the motor for adjusting the first throttle.

6. In a hydraulic power transmission for driving a load device at varying speeds and torques but at substantially constant horsepower and having a pump and fluid motor of fixed volumetric displacement, the combination of a flow-regulating device having an inlet port and a by-pass port, comprising a first throttle responsive to and adjustable by the pressure at the motor and designed to bypass around said motor an increasing amount of fluid with an increase of pump pressure whereby the speed of the motor driving the load device is decreased relative to an increase of torque at said motor, and a second throttle valve in series with the first throttle valve responsive to pressure changes ahead of and beyond the first throttle for maintaining a substantially constant pressure drop across the first throttle.

7. In a hydraulic power transmission for driving a load device at speeds which are varied in response to changes in torque and having a pump and fluid motor of fixed volumetric displacement, the combination of a flow-regulating device having an inlet port and a bypass port, comprising a first throttle responsive to and adjustable by the pressure at the motor and designed to by-pass around said motor an increasing amount of fluid with an increase of pump pressure whereby the speed of the motor driving the load device is decreased relative to an increase of torque at said motor, and a second throttle valve in series with the first throttle valve responsive to pressure changes ahead of and beyond the first throttle for maintaining a substantially constant pressure drop across the first throttle.

8. In a hydraulic power transmission system for driving a load device at speeds which are varied in response to changes in torque and containing a fluid pump and motor, the combination of a flow-regulating device comprising an adjustable first throttle valve responsive to and adjustable by pressure changes at the motor whereby the resistance of the throttle varies in predetermined relationship to changes of pressure at said motor, and a second throttle valve in series with the first throttle valve being responsive to pressure changes ahead of and beyond the first throttle for maintaining a constant pressure drop across the first throttle.

9. In a hydraulic power transmission system for driving a load device at varying speeds and torques but at substantially constant horsepower and containing a fluid pump and motor, the combination of a flow-regulating device comprising an adjustable first throttle valve responsive to and adjustable by pressure changes at the motor whereby the resistance of the throttle varies in predetermined relationship to changes of pressure at said motor, and a second throttle valve in series with the first throttle valve being responsive to pressure changes ahead of and beyond the first throttle for maintaining a constant pressure drop across the first throttle.

10. In a hydraulic power transmission for driving a load device at a speed which varies oppositely and as a predetermined function of load torque and having a pump and a fluid motor, the combination therewith of a first throttle valve connected to vary the rate of fluid flowing through the motor, means for varying the opening through the first throttle valve in response to change in pressure at the motor, and a compensating throttle valve connected to control the pressure drop across the first throttle valve including means responsive to the pressure drop across the first throttle valve for controlling the opening at the compensating throttle valve.

11. In a hydraulic power transmission for driving a load device at a speed which varies oppositely and as a predetermined function of load torque and having a pump and a fluid motor, the combination therewith of a first throttle valve connected to vary the rate of fluid flowing through the motor, means for varying the opening through the first throttle valve in response to changes in pressure at the motor, and a compensating throttle valve connected in series with the first throttle valve and responsive to the pressures across the same for maintaining a substantially constant pressure drop across the first throttle valve.

12. In a hydraulic power transmission for driving a load device at a speed which varies oppositely and as a predetermined function of load torque and having a pump and a fluid motor, the combination therewith of means forming a by-pass ahead of the motor, a first throttle valve responsive to and adjustable by changes of pressure at the motor for varying the by-pass volume and a second throttle valve responsive to the pressures ahead of and beyond the first throttle for maintaining a substantially constant pressure drop across the first throttle.

13. In a hydraulic power transmission for driving a load device at a speed which varies oppositely and as a predetermined function of load torque and having a pump and a fluid motor, the combination therewith of means forming a by-pass ahead of the motor, a first throttle valve responsive to and adjustable by changes of pressure at the motor for varying the by-pass volume and a second throttle valve in series with the first throttle valve and responsive to the pressures ahead of and beyond the first throttle for maintaining a substantially constant pressure drop across the first throttle.

WARREN BROWN.

REFERENCES CITED

The following references are of record in the file of this patent:

UNITED STATES PATENTS

| Number | Name | Date |
|---|---|---|
| 1,314,746 | Hayes | Sept. 2, 1919 |
| 2,059,152 | Smith | Oct. 27, 1936 |
| 2,064,864 | Temple | Dec. 22, 1936 |
| 2,082,473 | Tyler | June 1, 1937 |
| 2,111,964 | Crane | Mar. 22, 1938 |
| 2,181,049 | Douglas | Nov. 21, 1939 |
| 2,255,783 | Kendrick | Sept. 16, 1941 |
| 2,272,684 | Vickers | Feb. 10, 1942 |
| 2,288,830 | Nye | July 7, 1942 |
| 2,343,375 | Herman | Mar. 7, 1944 |